P. WILLIAMSON.

Railway Cooking Stove.

No. 26.

Reissued Sept. 30. 1840.

5368X

WITNESSES

G. R. Bowdon

John

Hon. P. Jones

Ger Weste

INVENTOR

P. Williamson

R. PETTER, Print. Washington, D.C.

UNITED STATES PATENT OFFICE.

PEREGRINE WILLIAMSON, OF NEW YORK, N. Y.

IMPROVEMENT IN THE MAKING OR MANUFACTURING OF THE PREMIUM RAILWAY COOKING-STOVE.

Specification forming part of Letters Patent dated February 16, 1829; Reissue No. 26, dated September 27, 1829.

*To all whom it may concern:*

Be it known that I, PEREGRINE WILLIAMSON, of the city of New York, in the State of New York, have invented an Improved Cooking-Stove, which I denominate the "Premium Railway Cooking-Stove;" and I do hereby declare that the following is a full and exact description thereof.

Figure 1:
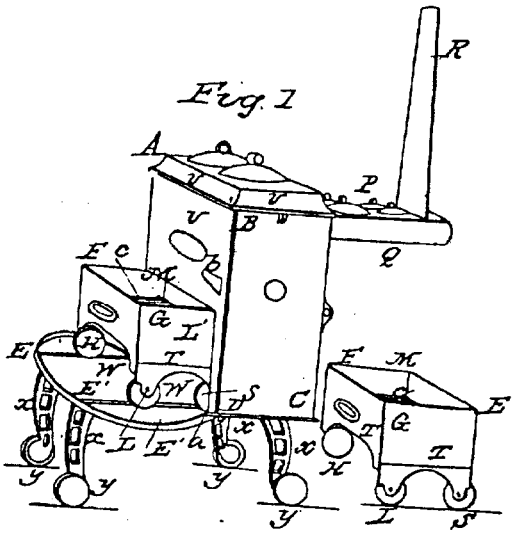

Figure 1 in the accompanying drawings is a perspective view of my railway cooking-stove.

In this figure A B C D is the box or body thereof, which is made of cast-iron. E E′ is the bottom plate and hearth, the hearth part being of such length and breadth as may be preferred. On the upper part of the back plate there is a collar of the kind usually employed to receive the stove-pipe, as seen at S, Fig. 3. This collar I make about ten or twelve inches long and about three inches deep. It is so made that it may receive a wide flat sheet-iron pipe, Q Q, the upper side of which I perforate with boiler-holes, in which may be inserted small cooking-utensils, as shown at P P. The outer end of this pipe is closed, and from it proceeds a common stove-pipe, R.

Figure 3:
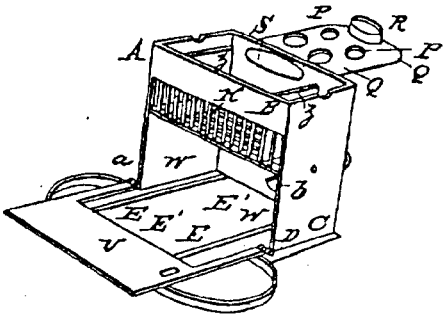

Within the upper part of the body of the stove there is a grate, (shown at K, Fig. 3;) but in Fig. 1 this is hidden by the front plate, U, which plate is hinged at its lower part, *a*, to the side plates or to the hearth, so as to admit of its being turned up, as in Fig. 1, or turned down, as in Fig. 3. In the former case it acts as a blower, and converts the upper part of the stove into a close stove, and in the latter case it lies upon and widens out the hearth. When up it is held in place by a latch, *b*, which passes through a mortise made in it for that purpose. The front or upper grate, the bars of which are seen at K, Fig. 3, may run either longitudinally or vertically. This grate rests upon ledges cast on each of the side plates, upon which it may be slid in and out. When the front or blower plate is up, a space of about an inch is left between it and the railway or sliding box for draft.

V V is the top or removable plate, which fits into the top of the stove, and has holes in it for boilers or other cooking-utensils. When removed, there is an open fire for cooking purposes at top as well as in front; or a large boiler may occupy its place; or a coffee-roaster may be placed above the fire, for which purpose notches are cast in the end plates, as at *d d*. The fire-place may be narrowed by means of cast-iron movable jambs. (Shown at *r r*.)

On the hearth-plate I cast ledges or ways, as shown at E W E W, upon which my railway-box or lower grate is to run, or by which it may be guided. This railway-box or lower grate is marked F G M L, and is shown separately in Fig. 2. It has a grate marked *e* standing horizontally within it, being placed upon ledges, and is elevated three or four inches above the bottom plate. It runs in and out upon the ways E W E W, for which purpose I place rollers H L S under it, adapted to run upon or alongside of the ways; or instead of such rollers I employ bearing-pieces on the under side of the box, which slide on said ways or ledges. It is in general intended to use this stove within a common fire-place; but with the view of readily removing it I place rollers or casters Y Y under its legs.

It is designed to light a fire in either or in both of the grates, as may be desired. When a fire is kindled on the lower grate, within the railway-box, this box may be drawn out and cooking-utensils of any suitable kind placed upon it. Cooking may also be performed above as well as in front of the upper grate, and also in the sheet-iron widened pipe behind the body of the stove.

Having thus fully described the manner in which I make and use my railway cooking-stove, what I claim therein as constituting my invention, and desire to secure by Letters Patent, is—

1. The manner in which I have constructed my railway-box or lower grate so as to slide or run in and out upon or by means of ways or ledges formed upon the lower plate of the stove, the whole operating substantially as set forth.

2. The manner of constructing the front or blower plate to rise and fall by means of joints or hinges at its lower part, in the manner and for the purpose described.

3. In combination with the movable front

Scanned at National Archives in Kansas City plate and the upper grate, the removable top for obtaining an open fire above as well as in front of the upper grate.

4. The enlarged sheet-iron pipe Q Q, perforated for cooking-utensils, and connected and combined with the other parts in the manner set forth.

In testimony whereof I hereunto set my name this 6th day of July, 1840.

P. WILLIAMSON.

Witnesses:
THOS. P. JONES,
B. CHAMBERS.

Scanned at National Archives in Kansas City